United States Patent
Chung et al.

(10) Patent No.: US 7,928,606 B2
(45) Date of Patent: Apr. 19, 2011

(54) INPUT DEVICE

(75) Inventors: Shin-Hong Chung, Shenzhen (CN);
 Han-Che Wang, Shenzhen (CN);
 Bin-Gang Duan, Shenzhen (CN);
 Shi-Quan Lin, Shenzhen (CN);
 Kuan-Hong Hsieh, Shenzhen (CN)

(73) Assignees: Ensky Technology (Shenzhen) Co., Ltd., Baoan District, Shenzhen, Guangdong Province (CN); Ensky Technology Co., Ltd., Pan Chiao, Taipei Hsien (TW)

( * ) Notice: Subject to any disclaimer, the term of this patent is extended or adjusted under 35 U.S.C. 154(b) by 483 days.

(21) Appl. No.: 11/753,578

(22) Filed: May 25, 2007

(65) Prior Publication Data
 US 2008/0147770 A1 Jun. 19, 2008

(30) Foreign Application Priority Data
 Dec. 14, 2006 (CN) .................. 2006 1 0201298

(51) Int. Cl.
 *H01H 9/00* (2006.01)
(52) U.S. Cl. ...................... 307/113; 307/139
(58) Field of Classification Search .......... 307/113, 307/139
 See application file for complete search history.

(56) References Cited

U.S. PATENT DOCUMENTS

| | | | | | |
|---|---|---|---|---|---|
| 4,538,074 | A | * | 8/1985 | Fraden | 307/126 |
| 5,204,986 | A | * | 4/1993 | Ito et al. | 455/343.1 |
| 6,278,598 | B1 | * | 8/2001 | Suzuki et al. | 361/93.9 |
| 6,437,709 | B1 | * | 8/2002 | Hao | 341/23 |
| 2007/0091060 | A1 | * | 4/2007 | Drader et al. | 345/102 |
| 2007/0262655 | A1 | * | 11/2007 | Lin et al. | 307/140 |

FOREIGN PATENT DOCUMENTS

CN 1869877 A 11/2006

* cited by examiner

*Primary Examiner* — Hal I Kaplan
(74) *Attorney, Agent, or Firm* — Winston Hsu; Scott Margo; Min-Lee Teng

(57) ABSTRACT

An input device includes a power unit, a power switch unit, a processing unit, and an input unit. The power switch unit includes a first switch for supplying power to the processing unit when actuated; the input unit is connected with the processing unit and the power switch unit and is configured for generating input signals that is transmitted to the processing unit and further used for controlling the first switch; and the processing unit is configured for receiving the input signal from the input unit, keeping the first switch switched on during a time period, and performing a task corresponding to the input signal during the time period.

8 Claims, 1 Drawing Sheet ic
INPUT DEVICE

BACKGROUND OF THE INVENTION

1. Field of the Invention

The invention relates to input devices, and more particularly, to an input device that conserves energy when inactive.

2. Description of Related Art

Nowadays, most electronic equipment use keyboards as their input units. The input devices consume power all the time when the electrical equipments are powered on, including the time when not actuated or used. This causes a waste of power.

To accommodate miniaturization of electronic devices, batteries tend to get smaller and so the need for conserving the power of the batteries is largely increased. Thus, if input devices have current flowing inside only when keys are actuated, it would increase the lifetime of the battery.

Therefore, a heretofore need exists in the industry to overcome the aforementioned deficiencies.

SUMMARY OF THE INVENTION

An input device includes a power unit, a power switch unit, a processing unit, and an input unit. The power switch unit includes a first switch for supplying power to the processing unit when actuated; the input unit is connected with the processing unit and the power switch unit and is configured for generating input signals that are transmitted to the processing unit and further used for controlling the first switch; and the processing unit is configured for receiving the input signal from the input unit, keeping the first switch switched on during a time period, and performing a task corresponding to the input signal during the time period.

Other systems, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

Figure 1:
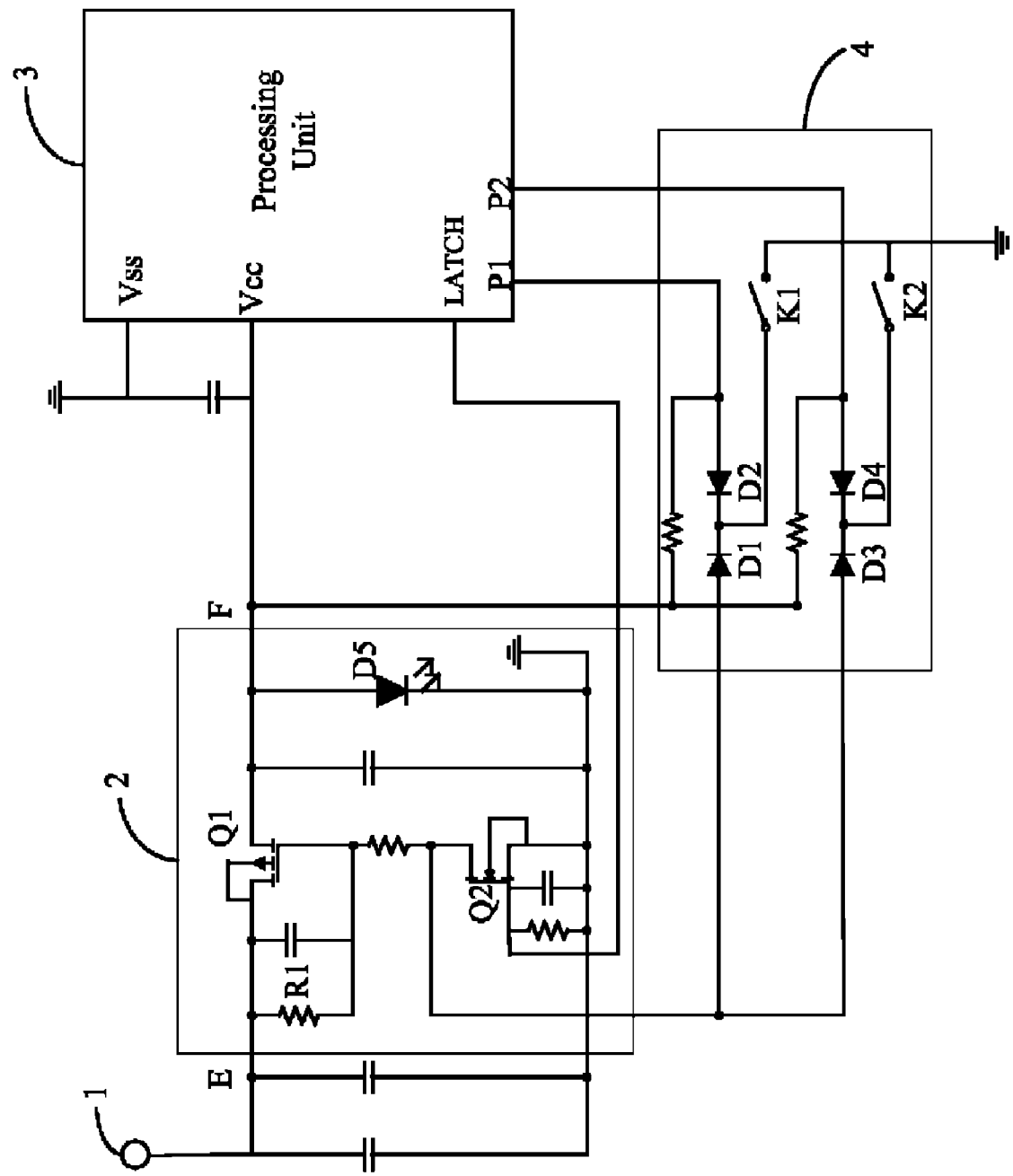
FIG. 1 is a schematic circuit diagram of an input device in accordance with a preferred embodiment of the present invention.

FIG. 1 is a schematic circuit diagram of an input device of the present invention. The input device includes a power unit 1, a power switch unit 2, a processing unit 3, and an input unit 4. The power unit 1, the power switch unit 2 and the processing unit 3 are connected as shown. An input terminal E of the power switch unit 2 is connected with the power unit 1 to receive power from the power unit 1, and an output terminal F of the power switch unit 2 is connected with a positive voltage input pin of the processing unit 3 to supply power to the processing unit 3. The input unit 4 is connected between the power switch unit 2 and the processing unit 3, and it serves as an input device of the processing unit 3.

The power switch unit 2 includes a first switch Q1, a second switch Q2, and a resistor R1. The first switch Q1 is connected between the input terminal E and the output terminal F of the power switch unit 2. In the preferred embodiment of the present invention, the first switch Q1 is a P-channel FET (Field-Effect Transistor) Q1 having a source, a gate, and a drain. The source of the P-channel FET Q1 is connected with the input terminal E of the power switch unit 2, and the drain of the P-channel FET Q1 is connected with the output terminal F of the power switch unit 2. In the present invention, the second switch Q2 is a N-channel FET Q2 also having a source, a gate, and a drain. The drain of the N-channel FET Q2 is connected with the gate of the P-channel FET Q1 through a resistor, the gate of the second FET Q2 is connected with a latch pin of the processing unit 3, and the source of the second FET Q2 is grounded. The resistor RI is connected between the source and the gate of the first FET Q1.

The input unit 4 includes one or more keys for generating input signals to the processing unit 3 when they are actuated. The processing unit 3 includes at least one input signal receiving pin for receiving input signals from keys of the input unit 4 respectively. For simplicity and a better understanding of the input unit 4, only two) keys K1 and K2 are shown in the drawing and depicted in the preferred embodiment. The keys K1 and K2 correspond to two input signal receiving pins P1 and P2 of the processing unit 3 respectively. However the input unit 4 cannot be construed to be limited to any particular number of keys. The input unit 4 further includes at least one pair of diodes. In the preferred embodiment, the number of diode pairs is equal to the number of the keys. The diodes of each diode pair have their cathodes connected together to form a common cathode, and have their anodes respectively connected to the drain of the N-channel FET Q2 and an input signal receiving pin of the processing unit 3. In the preferred embodiment, two diode pairs D1&D2 and D3&D4 are shown and depicted. The key K1 is connected between the common) cathode of the diode pair D1&D2 and ground and transmits input signals to the input signal receiving pin P1 of the processing unit 3 via the diode pair D1&D2. The key K2 is connected between the common cathode of the diode pair D3&D4 and ground and transmits input signals to the input signal receiving pin P2 of the processing unit 3 via the diode pair D3&D4.

If no key of the input unit 4 is actuated, no current flows through the resistor RI and no voltage drop between the gate and the source of the P-channel FET Q1 is produced. The P-channel FET Q1 is retained in an off state. As a result, no power is outputted to the processing unit 3 and the input unit 4 via the output terminal F of the power switch unit 2, and accordingly no power is consumed by the input device.

If any key is actuated, for example if key K1 is actuated, a conduction path from power unit 1 to ground via the resistor R1, the diode D1 and the key K1 is formed, a current flows through the resistor R1 and produces a voltage drop between the source and gate of the P-channel FET Q1, the P-channel FET Q1 is accordingly turned on and transports power to the processing unit 3 and the input unit 4 via the output terminal F.

After being powered on, the processing unit 3 sets input signal receiving pins at a high level and receives an input signal from the key K1 at the pin P1. The input signal changes the pin P1 from the high level to the low level. The processing unit 3 detects the voltage change at the pin P1 and thereby determines that key K1 is actuated. The processing unit 3 then sets the latch pin at the high level for a time period during which a task corresponding to the actuation of the key K1 is performed. The high level latch pin controls the N-channel FET Q2 to turn on, keeping the P-channel FET Q1 switching on until the task triggered by the actuation of key K1 is fully performed.

In the preferred embodiment a LED (light emitting diode) D5 is also included in the power switch unit 2. The LED D5 is positively connected between the output terminal F of the power switch unit 2 and ground. Each time when a key is actuated, power is supplied to the processing unit 3, and the input unit 4 is resumed, the LED D5 lights, this confirms the operation of pressing the key to operators.

Although the present invention has been specifically described on the basis of a preferred embodiment and preferred method thereof, the invention is not to be construed as being limited thereto. Various changes or modifications may be made to the embodiment and method without departing from the scope and spirit of the invention.

What is claimed is:

1. An input device comprising a power unit, a power switch unit, a processing unit, and an input unit including one or more keys;
    wherein, the power switch unit comprises a first switch for supplying power to the processing unit when actuated;
    the input unit is connected with the processing unit and the power switch unit and is configured for generating one or more input signals corresponding to the one or more keys that are transmitted to the processing unit and further used for controlling the first switch; and
    the processing unit is configured for receiving the one or more input signals from the input unit, keeping the first switch switched on during a time period when receiving the one or more input signals, and performing a task corresponding to the one or more input signals during the time period.

2. The input device according to claim 1, wherein the first switch is a first Field-Effect Transistor (FET) having a source, a gate, and a drain, the source is connected with an input terminal of the power switch unit, the gate is connected with the input unit, and the drain is connected with an output terminal of the power switch unit.

3. The input device according to claim 1, wherein the power switch unit further comprises a second switch connected with the first switch and the processing unit, and configured to be switched on and kept switched on by the processing unit during the time period.

4. The input device according to claim 3, wherein the second switch is configured for keeping the first switch switched on during the time period to perform the task.

5. The input device according to claim 4, wherein the second switch is a second FET having a source, a gate, and a drain, the drain is connected with the first switch, the gate is connected with and controlled by the processing unit, and the source terminal is connected to ground.

6. The input device according to claim 1, further comprising a LED inversely connected between the output terminal of the power switch unit and ground.

7. The input device according to claim 2, wherein the first FET is a P-channel FET.

8. The input device according to claim 5, wherein the second FET is a N-channel FET.

* * * * *